Feb. 8, 1927. 1,617,011
J. F. COOPER
BALLOON
Filed Nov. 3, 1924
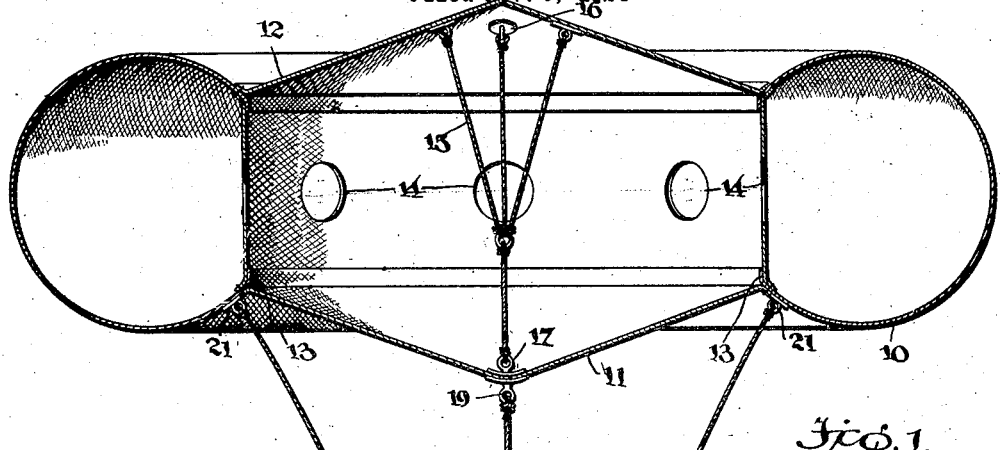
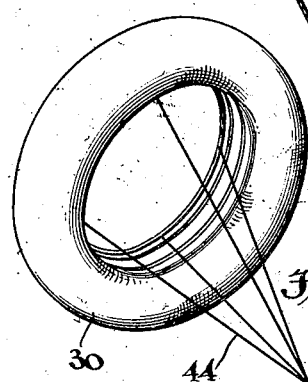
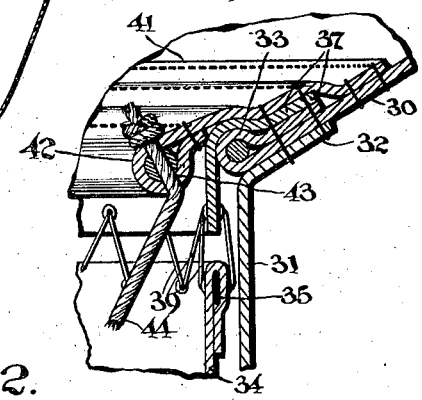
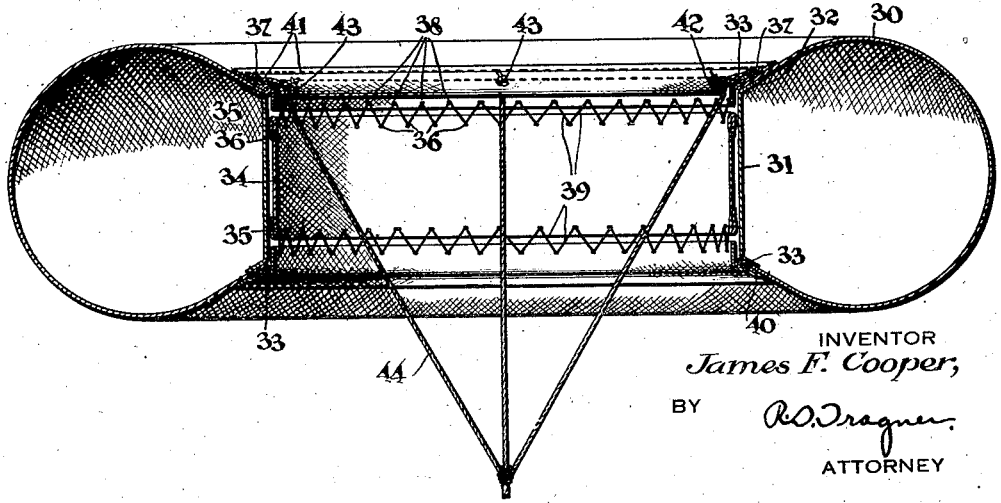
INVENTOR
James F. Cooper,
BY
R.O. Dragner
ATTORNEY Patented Feb. 8, 1927.

1,617,011

UNITED STATES PATENT OFFICE.

JAMES F. COOPER, OF AKRON, OHIO, ASSIGNOR TO THE GOODYEAR TIRE & RUBBER COMPANY, OF AKRON, OHIO, A CORPORATION OF OHIO.

BALLOON.

Application filed November 3, 1924. Serial No. 747,407.

My present invention relates to balloons, and has particular relation to the type known as captive balloons. A balloon constructed in accordance with the principles of my invention is particularly adapted for advertising purposes, that is, the balloon may be constructed in the form of the article which is to be advertised or may be painted to represent such article.

The object of my invention consists in providing a balloon so constructed that the expansion and contraction of the gas in the balloon will not materially change the shape thereof.

Another object of my invention is to provide a balloon having means adapted to resiliently resist gas pressure within certain limits and to maintain a smooth surface over substantially the entire area of the balloon under all conditions of atmospheric temperature.

Heretofore balloons have been used for display or advertising purposes but, so far as I am aware, all prior constructions have been substantially spherical in form and none of them has been provided with means as disclosed by my invention for maintaining adequate pressure upon the inner surface of the balloon even when the gas pressure therein has reduced to a considerable extent. I have also provided novel means for suspending the balloon which assists in maintaining a constant and uniform shape of the balloon.

Reference may now be had to the accompanying drawings which form a part of this specification and of which:

Fig. 1 is a cross sectional view of a balloon embodying the principles of my invention;

Fig. 2 represents another form which my invention may assume;

Fig. 3 is a cross-sectional detail view of the connecting members shown in Fig. 2; and Fig. 4 is a perspective view of the structure shown in Fig. 2.

In practicing my invention, I provide an inflatable annulus 10 composed of a light weight fabric which is substantially non-permeable to air, which is substantially circular in cross section and is similar in form to an automobile tire. Upon the inner periphery of the annulus 10 are provided two cone shaped members 11 and 12, also composed of light weight non-permeable material, representing a disk wheel used in conjunction with the tire 10, which are secured to the annulus in any suitable manner, as indicated at 13. The connection 13 must, of course, be airtight. The members 10, 11 and 12 constitute a container for gas and are maintained in open communication with each other by means of an opening 14 in the inner surface of the annulus 10. These members may be constructed of the conventional type of balloon fabric.

It is a well known fact that when a balloon is flying and exposed to the atmosphere which changes in temperature, such changes cause considerable variation in the pressure of the gas in the balloon, causing the surface of the balloon to be stretched when the gas expands and to become slack and wrinkled when the gas contracts. In order to overcome these disadvantages, I have provided resilient means which, as indicated in Fig. 1, consist of elastic cords 15, made of rubber or other suitable material, connected between the members 11 and 12, by means of patches 16 secured to the member 12 and to an eyelet 17 provided at the apex of the cone-shaped member 11. Any convenient number of these rubber or elastic members may be used. The elastic cords or strands are normally under tension, after the balloon has been inflated with the usual amount of gas.

It will be apparent from this construction that increased pressure exerted within the balloon against the inner surfaces of the members 11 and 12 will tend to stretch the rubber cords 15. On the other hand when the temperature is lowered and the gas contracts, the rubber cords will draw the members 11 and 12 toward each other and maintain the desired pressure upon the interior surface of the balloon. Thus the surfaces of the member 11 and the annulus 10 will be kept under substantially constant pressure and the surface of the member 12 will be moved with respect to the member 11 to allow for gas contraction or expansion.

A suspension cord 18 is connected to the apex of the cone shaped member 11 by means of a suitable eyelet 19 connected to the eyelet 17 and stabilizing suspension cords or wires 20 are connected to the member 18, and to the annulus portion of the balloon, as indicated at 21.

Referring now to the embodiment of my invention illustrated in Figs. 2 and 3, I have provided a balloon in the form of an annulus similar to that illustrated in Fig. 1, with the exception that the central portions constituted by the members 11 and 12 have been omitted. In this embodiment, an annulus 30 composed of a light-weight material non-permeable to air, serves to represent a pneumatic tire casing. A flat peripherally extending member 31, also composed of non-permeable light-weight material, is secured in any desired manner to the inner edges of the member 30, which represent the bead portions of the casing, as indicated at 32, and serves to complete the gas envelope. The member 30 is provided at its edges with two annular stiffening members 33, of wire or other suitable material, over which the edges of the fabric of the member 30 are folded. Disposed intermediate the two stiffening members 33 is a flat annular elastic pressure compensating member 34 composed of sheet rubber or the like. The member 34 is provided at each edge with an annular stiffening member 35 over which the edges are folded. The member 34 is provided at each edge, on the inner side of the stiffening member 35, with a plurality of punched holes or openings 36. Secured to the top edge of the member 30 and overlapping the stiffening member 33 is an annular patch or reinforcing member 37, the inner edge of which is provided with a plurality of openings 38, to which the elastic member 34 is secured by means of laces 39. In like manner, an annular reinforcing patch 40 is secured to the lower edge of the annulus 30 and is secured to the elastic member 34 by means of laces 39. If desired the lacing may be omitted and the member 34 secured directly to the patches 37 and 40 or directly to the annulus 30. Suitably secured to the upper edge of the annulus 30 and overlapping the member 37 is an annular reinforcing patch 41, the inner edge of which overlaps and supports an annular sectional stiffening member 42, which is preferably formed of a tube composed of duralumin or other suitable light weight material. The members 41 and 42 are provided with a plurality of spaced holes 43 by means of which suspension lines or cords 44 are connected to the balloon. It will be understood that my invention is not limited to the form of suspension above described as any suitable means may be employed to connect the members 44 to the member 42. The lines 44 are in turn secured to any desired object above which it is desired to float the balloon.

It will be understood, of course, that with a balloon constructed as illustrated in any of my drawings, the outer surface thereof would be painted to represent a tire tread and the side walls thereof would be provided with suitable advertising information, such, for example, as the name of the tire being advertised and the name of the manufacturer.

From foregoing description, it will be apparent that I have provided a balloon of considerable advertising value on account of the fact that it is of the configuration of the article to be advertised. Also, it will be apparent that by means of the temperature compensating feature, a balloon constructed in accordance with my invention will present a smooth surface of the desired configuration, irrespective of the changes in temperature to which it may be subjected.

Although I have illustrated but the preferred forms which my invention may assume and have described those forms in detail, it will be apparent to those skilled in the art that the invention is not so limited but that various modifications and changes may be made therein without departing from the spirit of the invention or from the scope of the appended claims

What I claim is:

1. An advertising medium comprising a balloon of circular configuration, a thickness less than the radius of the circular configuration, and means incorporated therein for preventing changes in configuration thereof with changes in temperature.

2. A balloon comprising an annulus of substantially circular cross-section, and suspension cords connected to the balloon proper adjacent the inner periphery of said annulus, the cords so converging that the annulus is adapted to be suspended from a single point.

3. A balloon comprising an annulus of substantially circular cross-section, and means associated with the annulus for tensioning the balloon fabric to accommodate expansion or contraction of gas in the balloon.

4. A balloon comprising an annulus of substantially circular cross-section, and elastic means associated with the annulus for tensioning the balloon fabric regardless of expansion or contraction of the balloon gas caused by changes in temperature.

5. A balloon comprising an annulus of substantially circular cross-section and elastic means associated with the inner periphery of the annulus for taking up slack in the balloon fabric and yieldingly resisting expansion of the gas in the balloon.

6. A balloon comprising a portion in the form of an annulus and a strip of elastic material secured to the inner periphery of the annulus.

7. A balloon comprising an annulus adapted to be inflated, and resilient gas pressure compensating means connected at spaced points around the inner periphery of said annulus.

8. A balloon comprising an annulus adapted to be inflated, and a strip of resilient material laced at its opposite edges adjacent the inner periphery of said annulus.

9. A balloon comprising an annulus adapted to be inflated and a rubber strip secured to the inner periphery of said annulus.

10. A balloon comprising an annulus adapted to be inflated, stiffennig means secured to the inner periphery of said annulus, annular reinforcing patches positioned adjacent said inner periphery and an elastic strip adapted to be secured at its opposite edges to said patches.

11. A balloon comprising an annulus adapted to be inflated, stiffennig means secured thereto adjacent the inner periphery of said annulus, fabric strip patches extending adjacent the stiffening means and a rubber strip adapted to be laced at its opposite edges to said patches.

12. A balloon comprising an annulus, spaced fabric strips secured adjacent the inner periphery of said annulus, a resilient strip provided at its edges with reinforcing means and lacing means between the opposite edges of the resilient strip and the fabric strips.

13. A balloon comprising an annulus adapted to be inflated, a strip of elastic material secured at its opposite edges to the inner periphery of the annulus and a patch adjacent the periphery provided with stiffening means to which suspension cords are attached.

14. A balloon comprising an annulus, a strip of elastic material adapted to be laced at its opposite edges adjacent the inner periphery of the annulus and a suspension patch secured to the annulus adjacent one of the laced portions of the elastic material, said patch being provided with a metal ring supporting suspension cords.

In witness whereof, I have hereunto signed my name.

JAMES F. COOPER.